United States Patent
Cheng et al.

(10) Patent No.: US 11,573,886 B2
(45) Date of Patent: Feb. 7, 2023

(54) DEVICE AND METHOD OF BUILDING TEST FILE

(71) Applicants: Inventec (Pudong) Technology Corp., Shanghai (CN); Inventec Corporation, Taipei (TW)

(72) Inventors: Che-Sheng Cheng, Taipei (TW); Yen-Chen Chuang, Taipei (TW); Kuo-Hsin Hsu, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 17/391,060

(22) Filed: Aug. 2, 2021

(65) Prior Publication Data

US 2022/0391307 A1 Dec. 8, 2022

(30) Foreign Application Priority Data

Jun. 8, 2021 (CN) .......................... 202110635204.2

(51) Int. Cl.
*G06F 11/36* (2006.01)

(52) U.S. Cl.
CPC ...... *G06F 11/3684* (2013.01); *G06F 11/3688* (2013.01)

(58) Field of Classification Search
CPC ............. G06F 11/0793; G06F 11/1417; G06F 11/1471; G06F 11/1658; G06F 11/202; G06F 11/3672; G06F 11/3688
See application file for complete search history.

(56) References Cited

U.S. PATENT DOCUMENTS

| | | | | |
|---|---|---|---|---|
| 5,983,001 | A  * | 11/1999 | Boughner | G06F 9/45512 714/E11.193 |
| 8,595,714 | B1 * | 11/2013 | Hamer | G06F 9/45558 718/1 |
| 8,645,675 | B2 * | 2/2014 | Gillespie | G06F 9/44505 713/2 |
| 10,509,631 | B2 * | 12/2019 | Duan | G06F 11/3684 |
| 10,848,563 | B2 * | 11/2020 | Mehta | H04L 67/75 |
| 11,200,157 | B1 * | 12/2021 | Mathew | G06F 11/3688 |
| 2019/0317735 | A1 * | 10/2019 | Duan | G06F 8/34 |
| 2021/0263712 | A1 * | 8/2021 | McSweeney | G06F 8/43 |

* cited by examiner

*Primary Examiner* — Kamini B Patel
(74) *Attorney, Agent, or Firm* — Winston Hsu

(57) ABSTRACT

A device for building a test file comprises a receiving module, for receiving a first request of a first user and for analyzing the first request, and for notifying an analysis result of the first request to the first user; a building module, coupled to the receiving module, for building the test file according to the first request of a task queue; and a transmitting module, coupled to the building module, for notifying a building result of the test file to the first user.

9 Claims, 5 Drawing Sheets

DEVICE AND METHOD OF BUILDING TEST FILE

CROSS REFERENCE TO RELATED APPLICATION

This non-provisional application claims priority of China patent application No. 202110635204.2, filed on 8 Jun. 2021, included herein by reference in its entirety.

BACKGROUND OF THE INVENTION

1. Field of the Invention

The present invention relates to a device and a method utilizing the same, and more particularly, to a device and a method of building a test file.

2. Description of the Prior Art

A user needs to notify a building personnel to modify a basic input output system (BIOS) code and to build a test file for testing the BIOS via the building personnel, when the user intends to modify the BIOS code. The user receives the built test file from the building personnel and tests the BIOS accordingly, after the building personnel builds the test file. However, the abovementioned human operations involving the building personnel not only increase consumption of human resources, but also increase risk of errors. These problems become more serious, when the building personnel repeatedly performs the abovementioned human operations. Thus, how to build the test file for testing the BIOS while decreasing the consumption of the human resources and decreasing the risk of the errors is a problem to be solved.

SUMMARY OF THE INVENTION

The present invention therefore provides a device and related method for building a test file to solve the abovementioned problem.

A device for building a test file comprises a receiving module, for receiving a first request of a first user and for analyzing the first request, and for notifying an analysis result of the first request to the first user; a building module, coupled to the receiving module, for building the test file according to the first request of a task queue; and a transmitting module, coupled to the building module, for notifying a building result of the test file to the first user.

A method for building a test file comprises receiving a request of a user and analyzing the request, and notifying an analysis result of the request to the user; building the test file according to the request of a task queue; and notifying a building result of the test file to the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
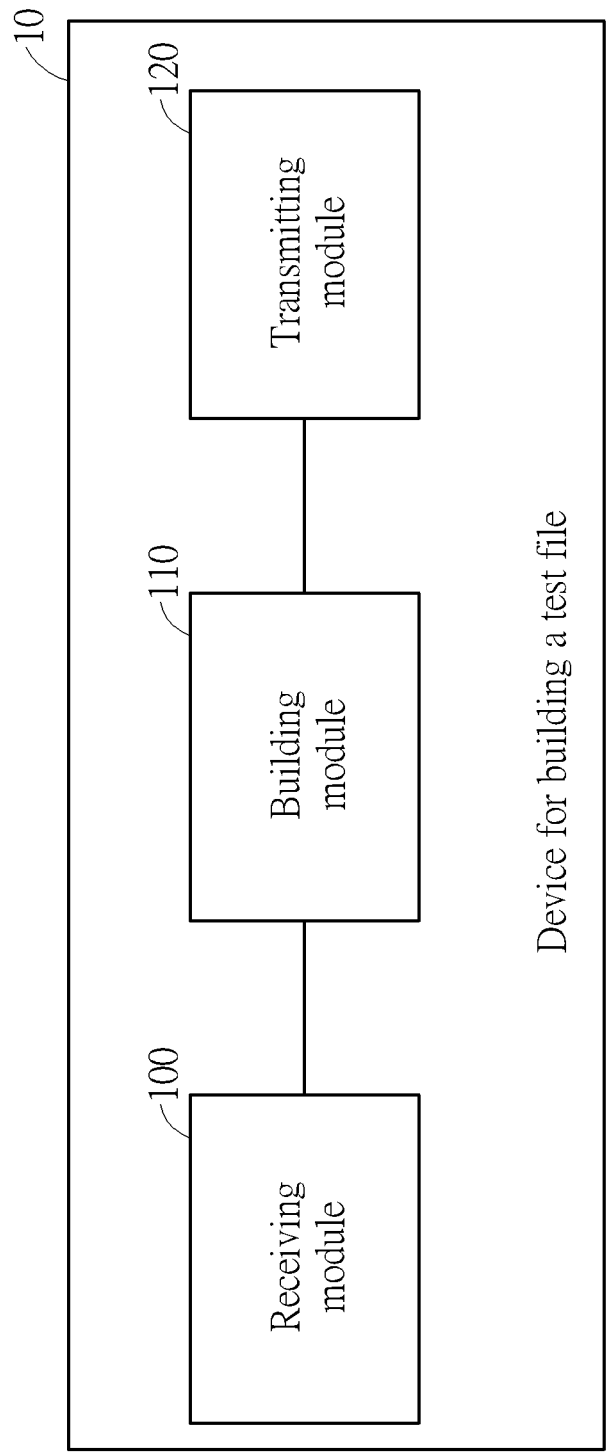
FIG. 1 is a schematic diagram of a device for building a test file according to an example of the present invention.

FIG. 1 is a schematic diagram of a device 10 for building a test file according to an example of the present invention. As shown in FIG. 1, the device 10 for building the test file includes a receiving module 100, a building module 110 and a transmitting module 120. In detail, the receiving module 100 may be for receiving a first request of a first user and for analyzing (e.g., interpreting or parsing) the first request, and may be for notifying an analysis result of the first request to the first user. The building module 110 is coupled to the receiving module 100, may be for building the test file according to the first request of a task queue. The transmitting module 120 is coupled to the building module 110, may be for notifying (e.g., transmitting) a building result of the test file to the first user.

In one example, the receiving module 100 may receive the first request of the first user via monitoring (e.g., periodically querying) a communication software (e.g., a folder of the communication software). In one example, the receiving module 100 may notify the analysis result of the first request to the first user via the communication software. In one example, the transmitting module 120 may notify the building result of the test file to the first user via the communication software. In one example, the communication software may include an email software (e.g., Outlook or Gmail), an instant messaging software (e.g., Skype) or a combination thereof, and is not limited herein.

In one example, in the operation of notifying the analysis result of the first request to the first user, the receiving module 100 may add the first request to the task queue and may notify that the first request is received to the first user, when the analysis result is successful. In addition, the receiving module 100 may receive a second request. In one example, the receiving module 100 may notify that the first request is failed to the first user, when the analysis result is unsuccessful. In addition, the receiving module 100 may receive the second request. In one example, the receiving module 100 may receive the second request from the first user or a second user.

In one example, in the operation of building the test file according to the first request of the task queue, the building module 110 may determine (e.g., analyze) a platform of the first request according to the first request of the task queue. The building module 110 may generate a script for the platform. The building module 110 may execute (e.g., run) the script and may wait for the script to be successfully executed. The building module 110 may build the test file (e.g., the test file is built), when the script is successfully executed. In one example, the script may include at least one instruction for building the test file. In one example, the at least one instruction may be predetermined or dynamically determined.

In one example, the platform may include an operating system. In one example, the operating system may include WINDOWS XP, WINDOWS VISTA, WINDOWS 7, WINDOWS 8, WINDOWS 10, any version among the above WINDOWS operating system versions or subsequent operating system versions of WINDOWS 10, and is not limited herein.

In one example, the first request or the second request may include a version or a machine type of a basic input output system (BIOS). In one example, the building module 110 may determine (e.g., analyze) the platform of the first request or the second request according to the version or the machine type.

In one example, the first request or the second request may include a compressed file. The compressed file may include a path (e.g., a link), source codes, information related to the source codes, or a combination of the above information, and is not limited herein. In one example, the building module 110 may determine (e.g., analyze) the platform of the first request or the second request according to the above information or the combination of the above information. In one example, the test file may include a binary file, a description file or an information file for testing the BIOS.

In one example, in the operation of notifying the building result of the test file to the first user, the transmitting module 120 may determine whether an error occurs according to an error code of the test file. In one example, the transmitting module 120 may analyze (e.g., interpret or parse) a log of the test file and may notify the building result to the first user, when the error occurs. The building result may include an error message related to the error code. In one example, the transmitting module 120 may transmit the test file to a file transfer space and may notify the building result to the first user, when the error does not occur. In one example, the building result may include that the first request is successfully built and an access information of the file transfer space.

In one example, in the operation of transmitting the test file to the file transfer space, the transmitting module 120 may compress the test file to generate a compressed test file, and may transmit the compressed test file to the file transfer space. In one example, the transmitting module 120 may compress the test file to generate the compressed test file via a data compression software. In one example, the data compression software may include ZIP, RAR or 7z, and is not limited herein.

In one example, in the operation of transmitting the test file to the file transfer space, the transmitting module 120 may transmit the test file to the file transfer space according to a file transfer protocol (FTP). In one example, the access information may include an access link or at least one port, and is not limited herein. In one example, the at least one port may include a command port (e.g., port 21) or a data port (e.g., port 20), and is not limited herein.

Figure 2:
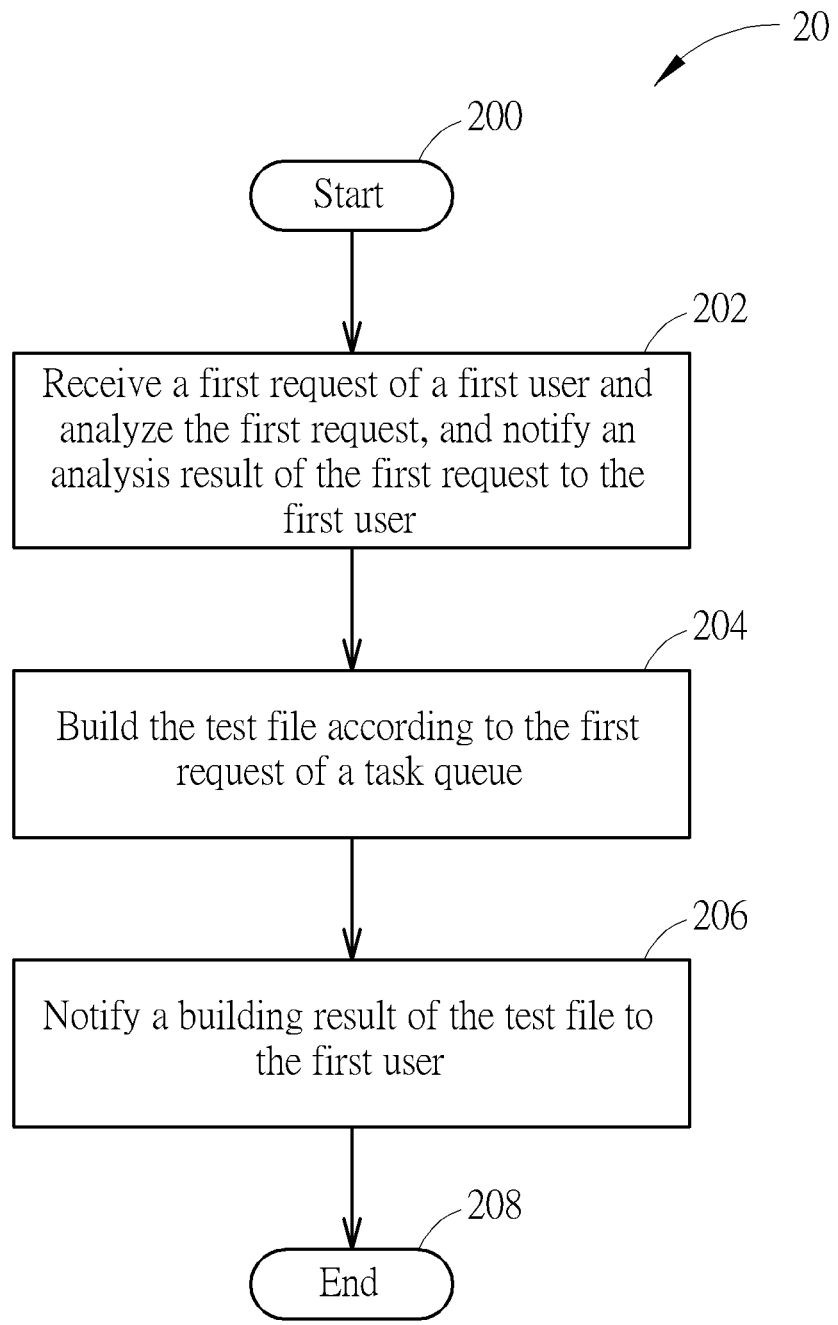
FIG. 2 is a flowchart of a process according to an example of the present invention.

Operations of the device 10 for building the test file in the above examples can be summarized into a process 20 shown in FIG. 2. The process 20 includes the following steps:

Step 200: Start.

Step 202: Receive a first request of a first user and analyze the first request, and notify an analysis result of the first request to the first user.

Step 204: Build the test file according to the first request of a task queue.

Step 206: Notify a building result of the test file to the first user.

Step 208: End.

Figure 3:
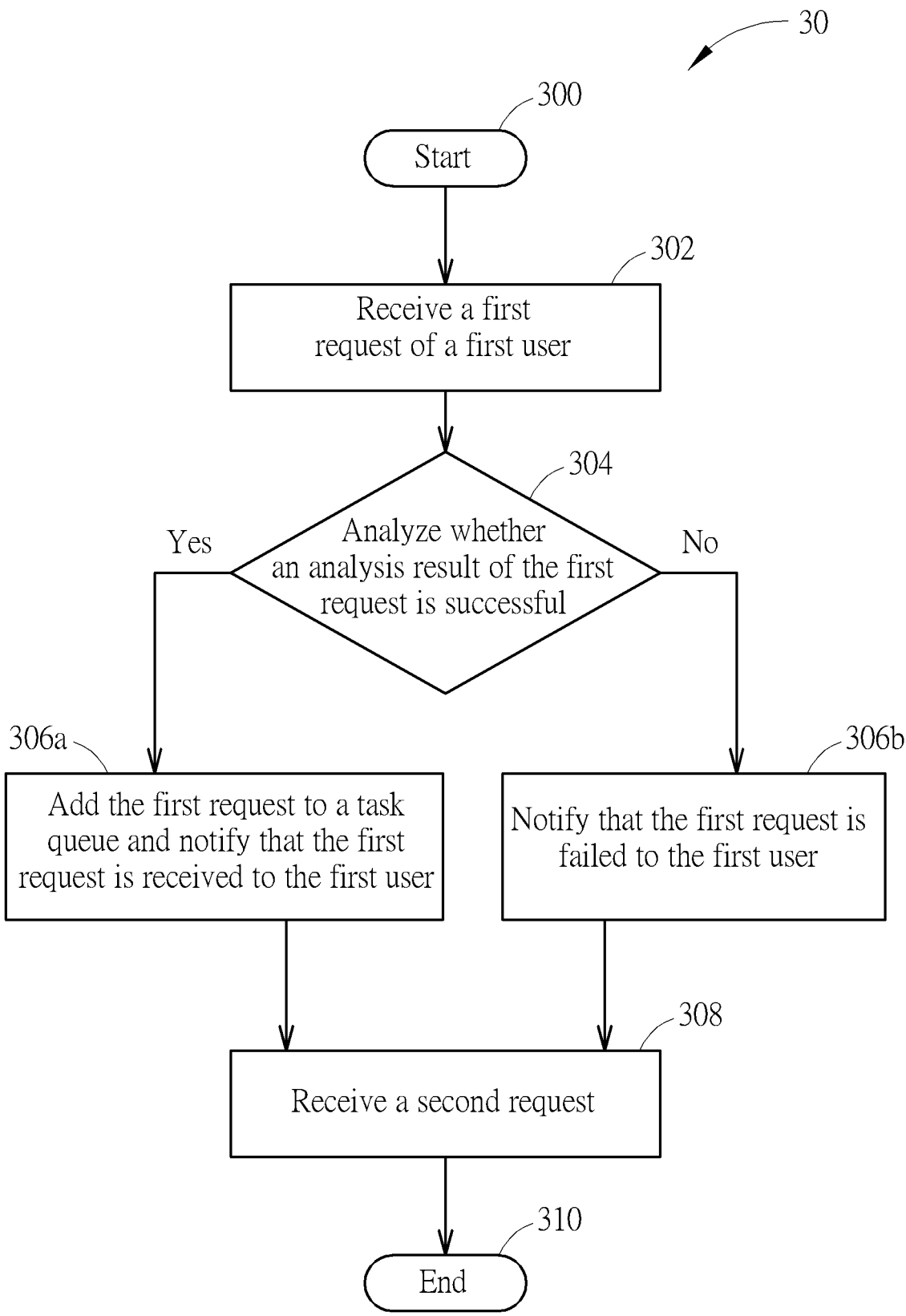
FIG. 3 is a flowchart of a process according to an example of the present invention.

Operations of the receiving module 100 in the above examples can be summarized into a process 30 shown in FIG. 3. The process 30 includes the following steps:

Step 300: Start.

Step 302: Receive a first request of a first user.

Step 304: Analyze whether an analysis result of the first request is successful.

Step 306*a*: Add the first request to a task queue and notify that the first request is received to the first user, when the analysis result is successful.

Step 306*b*: Notify that the first request is failed to the first user, when the analysis result is unsuccessful.

Step 308: Receive a second request.

Step 310: End.

Figure 4:
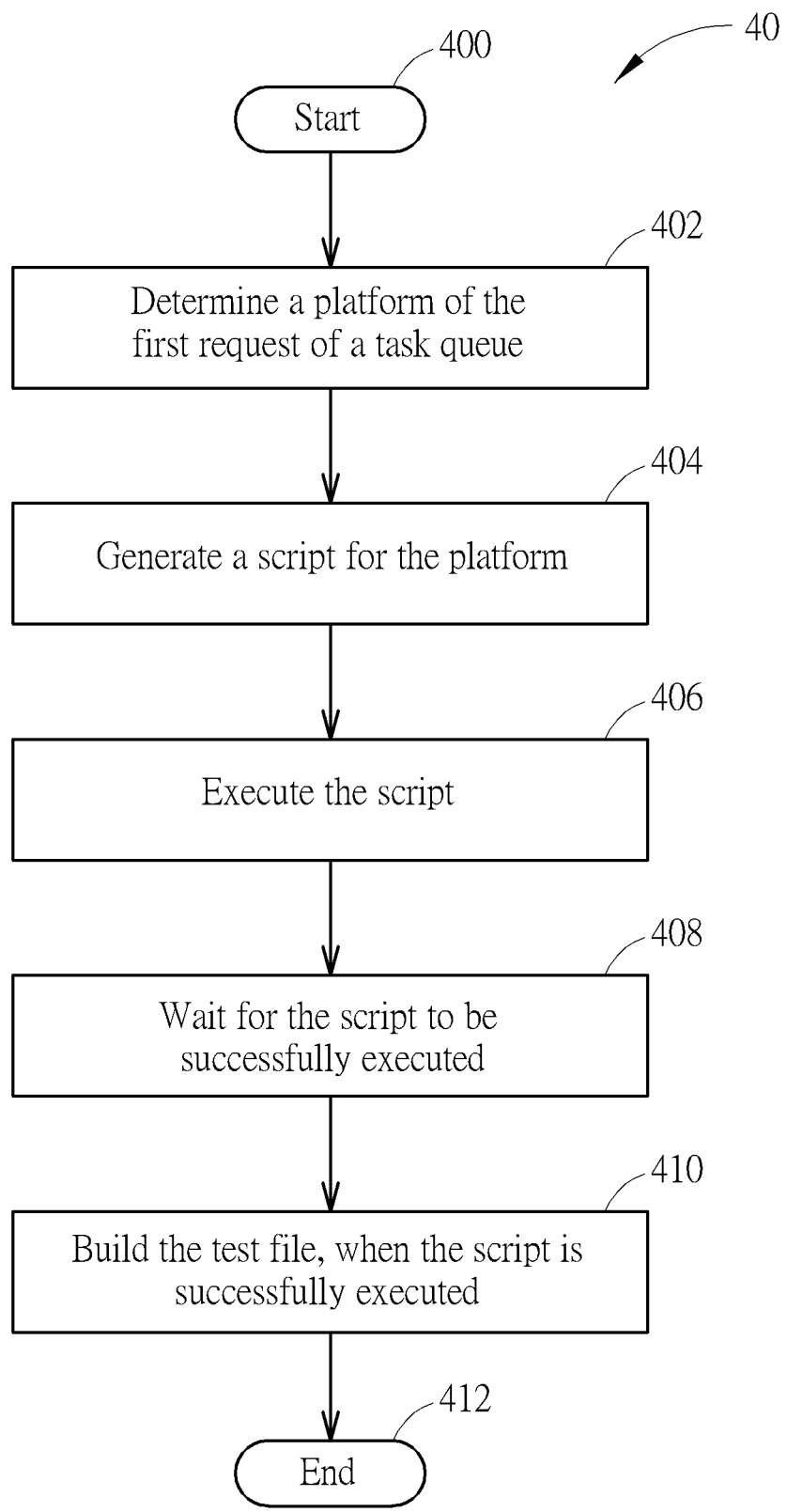
FIG. 4 is a flowchart of a process according to an example of the present invention.

Operations of the building module 110 in the above examples can be summarized into a process 40 shown in FIG. 4. The process 40 includes the following steps:

Step 400: Start.

Step 402: Determine a platform of the first request of a task queue.

Step 404: Generate a script for the platform.

Step 406: Execute the script.

Step 408: Wait for the script to be successfully executed.

Step 410: Build the test file, when the script is successfully executed.

Step 412: End.

Figure 5:
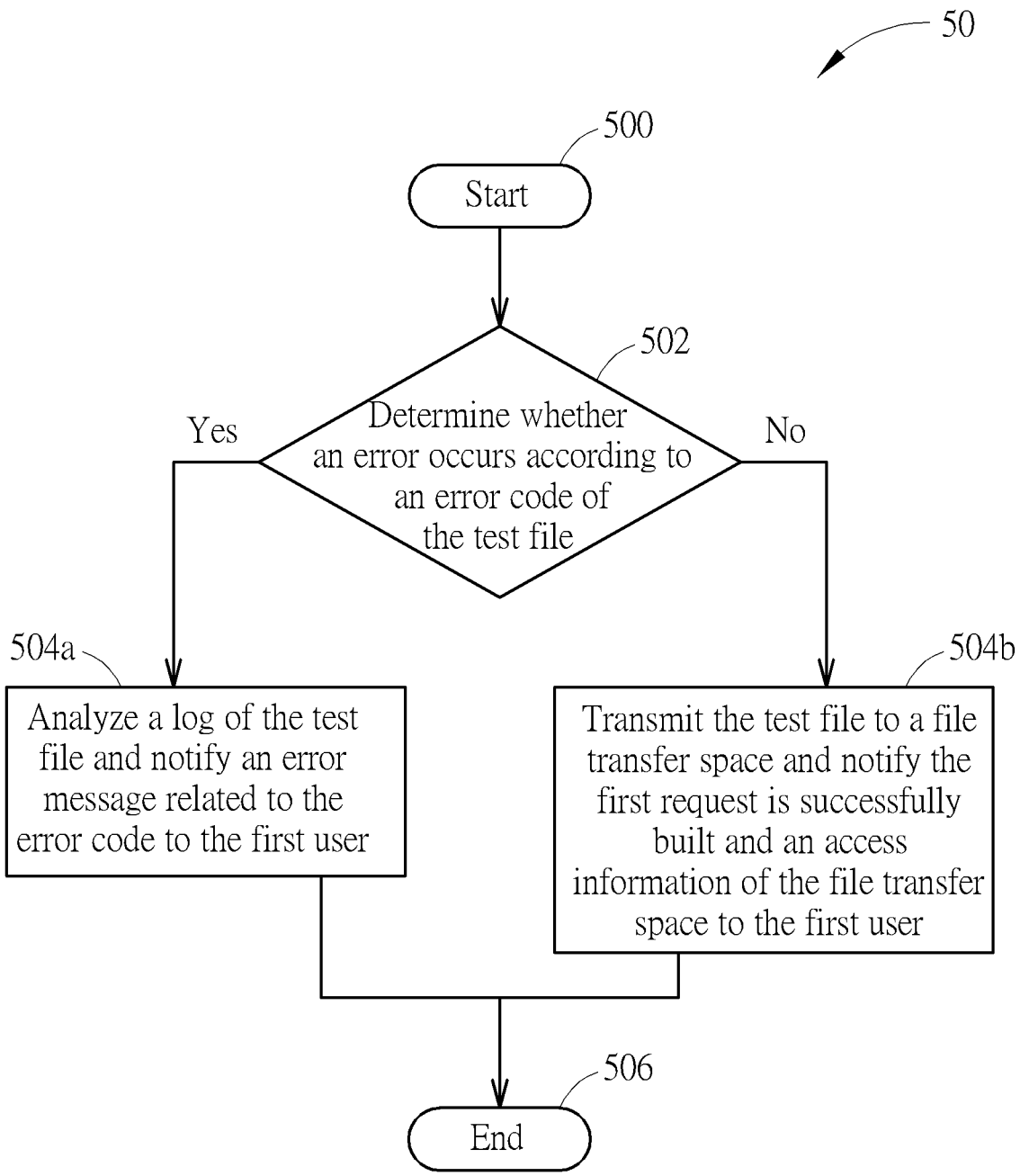
FIG. 5 is a flowchart of a process according to an example of the present invention.

Operations of the transmitting module 120 in the above examples can be summarized into a process 50 shown in FIG. 5. The process 50 includes the following steps:

Step 500: Start.

Step 502: Determine whether an error occurs according to an error code of the test file.

Step 504*a*: Analyze a log of the test file and notify an error message related to the error code to the first user, when the error Occurs.

Step 504*b*: Transmit the test file to a file transfer space and notify the first request is successfully built and an access information of the file transfer space to the first user, when the error does not occur.

Step 506: End.

It should be noted that, the abovementioned "first" and "second" are used for distinguishing related statements, and are not used for limiting an order of related statements.

It should be noted that, realizations of the device 10 for building the test file (and the receiving module 100, the building module 110 and/or the transmitting module 120 therein) are various. For example, the abovementioned modules may be integrated into one or more modules. In addition, the device 10 for building the test file (and the receiving module 100, the building module 110 and/or the transmitting module 120 therein) may be realized by hardware (e.g., circuit or chip), software (e.g., code), firmware (known as a combination of a hardware device, computer instructions and data that reside as read-only software on the hardware device), an electronic system or a combination of the devices mentioned above, and is not limited herein. The abovementioned description, steps and/or processes may be realized by hardware (e.g., circuit or chip), software (e.g., code), firmware (known as a combination of a hardware device, computer instructions and data that reside as read-only software on the hardware device), an electronic system or a combination of the devices mentioned above, and is not limited herein.

To sum up, the present invention provides a device and related method for building a test file. A user may notify a request to a device for building a test file via a communication software, when the user intends to modify a BIOS code. The device for building the test file may automatically receive the request, may automatically build the test file for testing the BIOS, and may automatically transmit the built test file to the first user. That is, there is no human operation of the building personnel involved in the process of building the test file. Thus, the problem caused by human operations involving the building personnel in the prior art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device for building a test file, comprising:
   a receiving circuit, for receiving a first request of a first user and for analyzing the first request, and for notifying an analysis result of the first request to the first user;
   a building circuit, coupled to the receiving circuit, for building the test file according to the first request of a task queue; and
   a transmitting circuit, coupled to the building circuit, for notifying a building result of the test file to the first user;
   wherein notifying the building result of the test file to the first user comprises:
      determining whether an error occurs according to an error code of the test file;
      analyzing a log of the test file and notifying the building result to the first user, when the error occurs, wherein the building result comprises an error message related to the error code; and
      transmitting the test file to a file transfer space and notifying the building result to the first user, when the error does not occur, wherein the building result comprises that the first request is successfully built and an access information of the file transfer space.

2. The device of claim 1, wherein notifying the analysis result of the first request to the first user comprises:
   adding the first request to the task queue and notifying that the first request is received to the first user, when the analysis result is successful;
   notifying that the first request is failed to the first user, when the analysis result is unsuccessful; and
   receiving a second request.

3. The device of claim 2, wherein the second request is received from the first user or a second user.

4. The device of claim 1, wherein building the test file according to the first request of the task queue comprises:
   determining a platform of the first request;
   generating a script for the platform;
   executing the script and waiting for the script to be successfully executed; and
   building the test file, when the script is successfully executed.

5. The device of claim 1, wherein the first request comprises a version of a basic input output system (BIOS).

6. The device of claim 5, wherein the test file comprises a binary file for testing the BIOS.

7. The device of claim 1, wherein transmitting the test file to the file transfer space comprises:
   compressing the test file to generate a compressed test file, and transmitting the compressed test file to the file transfer space.

8. The device of claim 1, wherein transmitting the test file to the file transfer space comprises:
   transmitting the test file to the file transfer space according to a file transfer protocol (FTP).

9. A method for building a test file, comprising:
   receiving a request of a user and analyzing the request, and notifying an analysis result of the request to the user;
   building the test file according to the request of a task queue; and
   notifying a building result of the test file to the user;
   wherein notifying the building result of the test file to the user comprises:
      determining whether an error occurs according to an error code of the test file;
      analyzing a log of the test file and notifying the building result to the user, when the error occurs, wherein the building result comprises an error message related to the error code; and
      transmitting the test file to a file transfer space and notifying the building result to the user, when the error does not occur, wherein the building result comprises that the request is successfully built and an access information of the file transfer space.

* * * * *